Jan. 3, 1956  R. ESTRADA  2,729,335
CLARIFIERS
Filed Oct. 17, 1951  12 Sheets-Sheet 1
FIG. 1
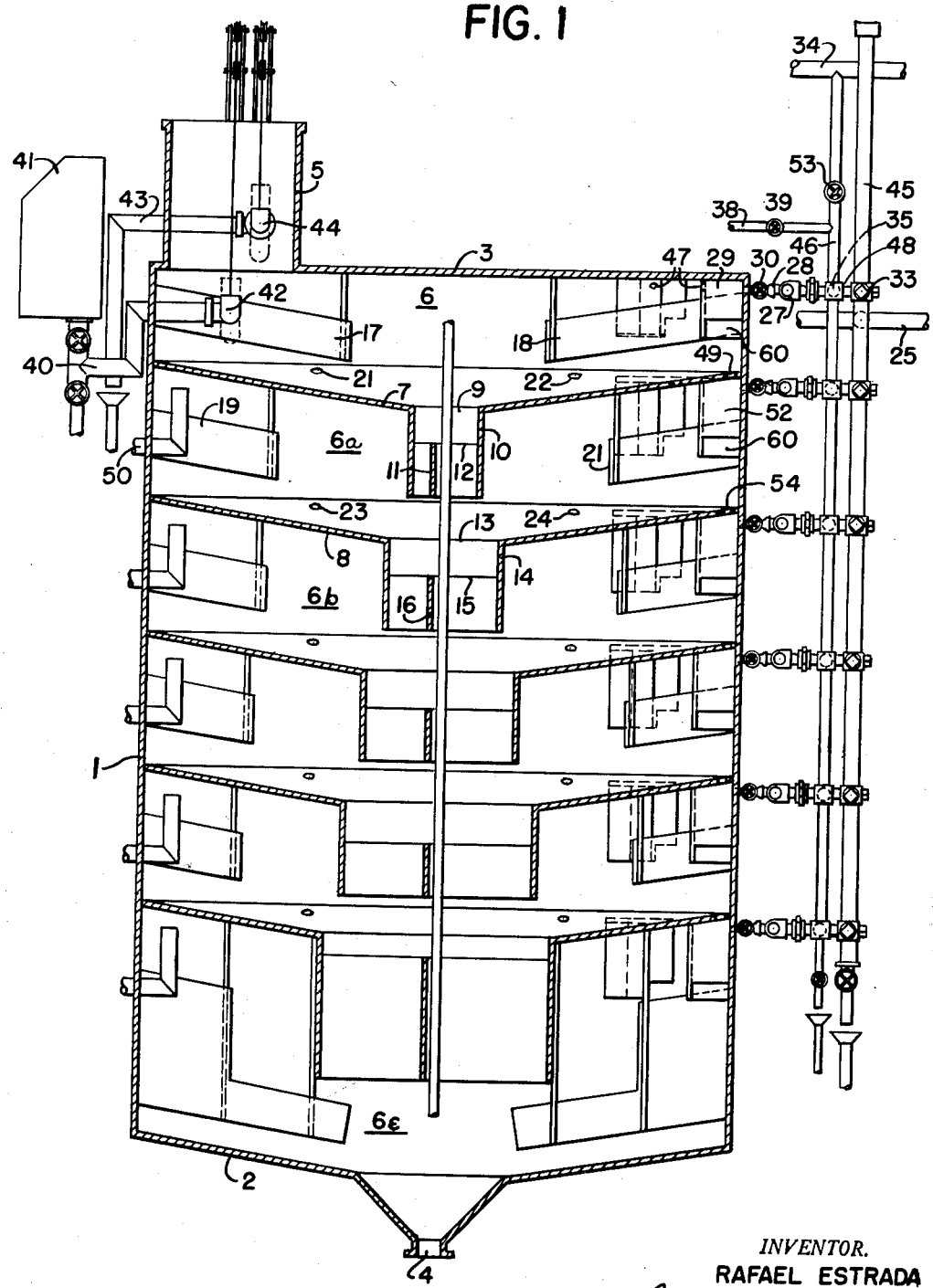
INVENTOR.
RAFAEL ESTRADA
BY 
ATTORNEY Jan. 3, 1956

R. ESTRADA 2,729,335

CLARIFIERS

Filed Oct. 17, 1951

INVENTOR.
RAFAEL ESTRADA

BY

ATTORNEY

Jan. 3, 1956                R. ESTRADA                    2,729,335
                            CLARIFIERS
Filed Oct. 17, 1951                                 12 Sheets-Sheet 3

INVENTOR.
RAFAEL ESTRADA
BY
ATTORNEY

INVENTOR.
RAFAEL ESTRADA
BY
ATTORNEY

Jan. 3, 1956   R. ESTRADA   2,729,335
CLARIFIERS
Filed Oct. 17, 1951   12 Sheets-Sheet 5
FIG. 4
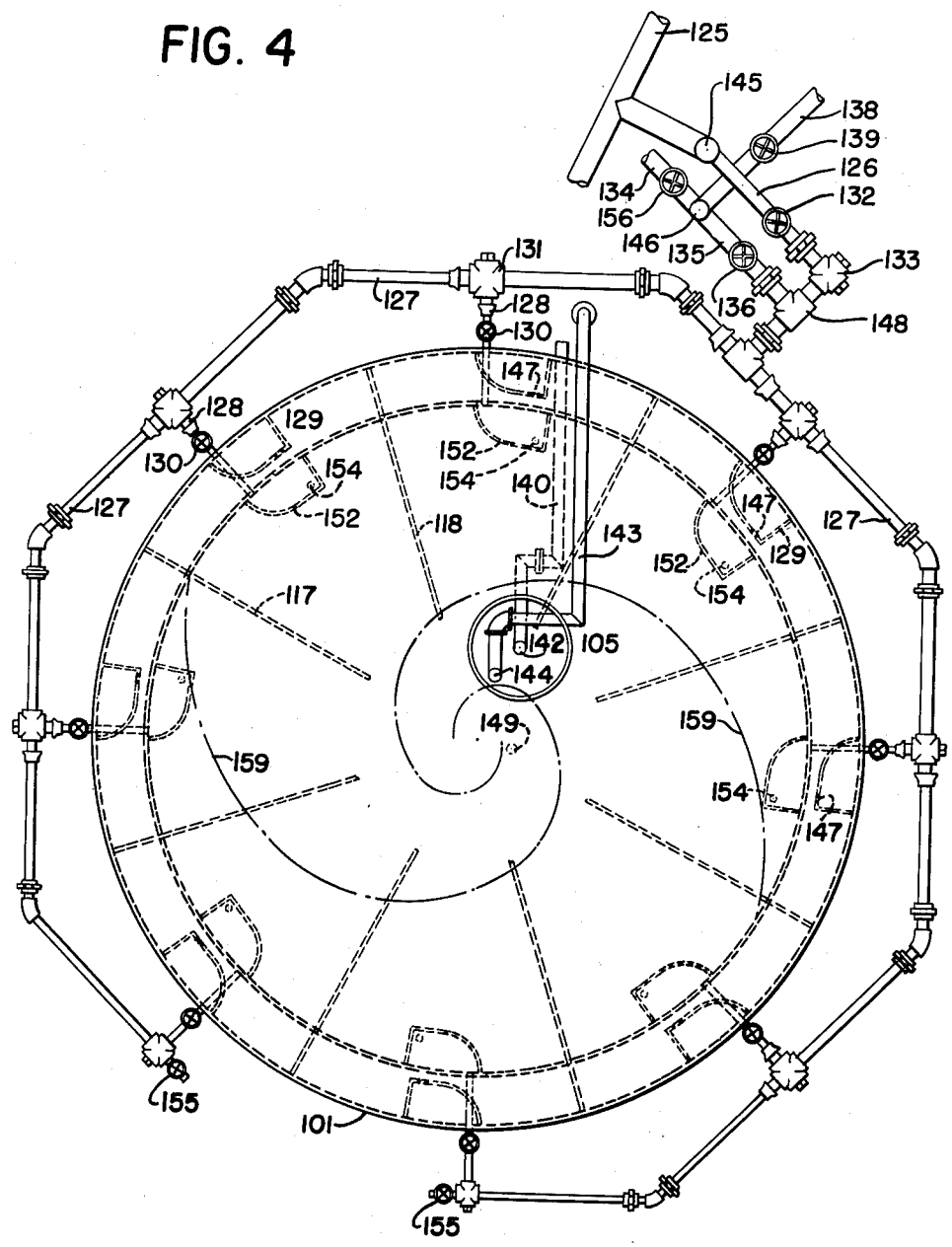
INVENTOR.
RAFAEL ESTRADA
BY
ATTORNEY

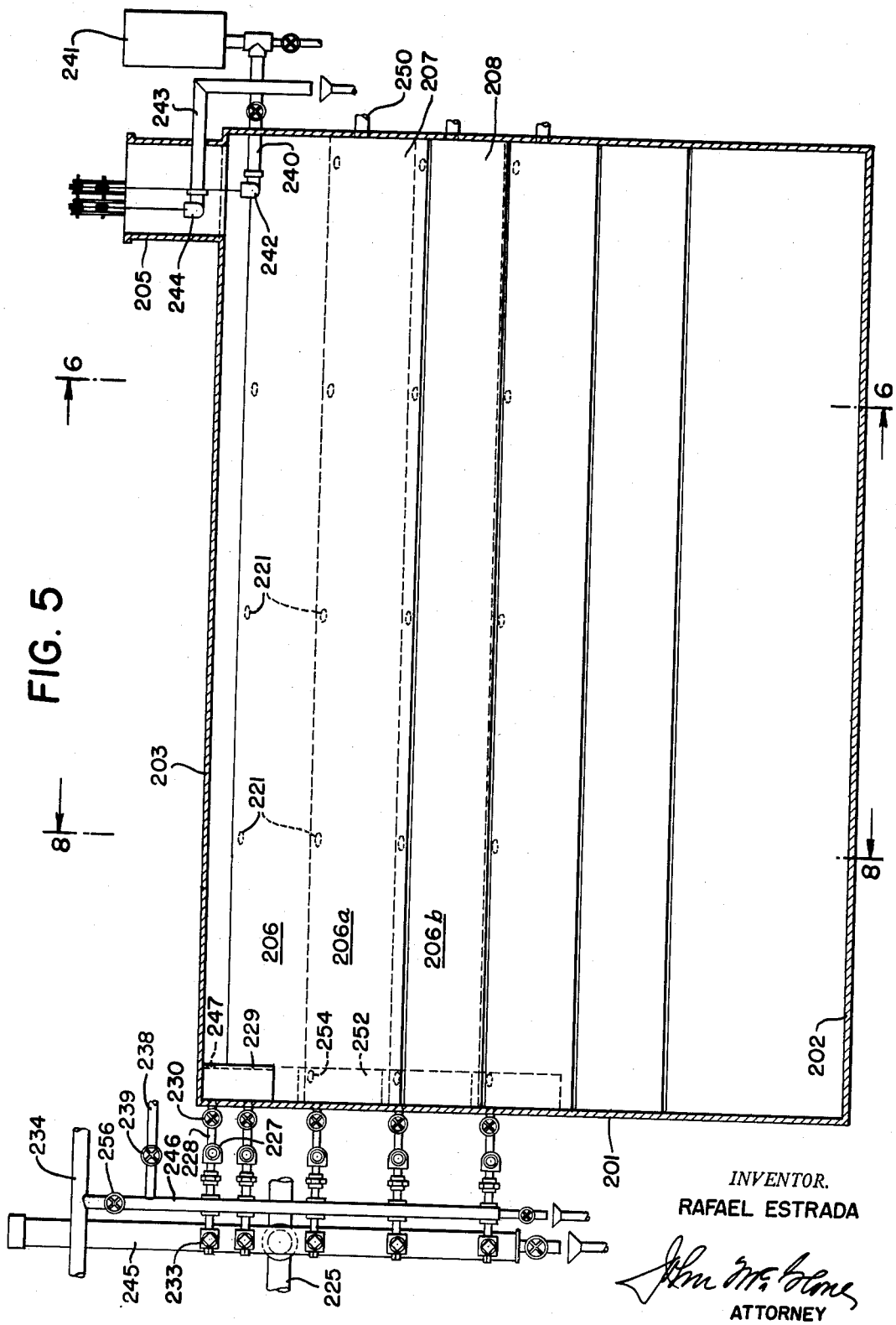

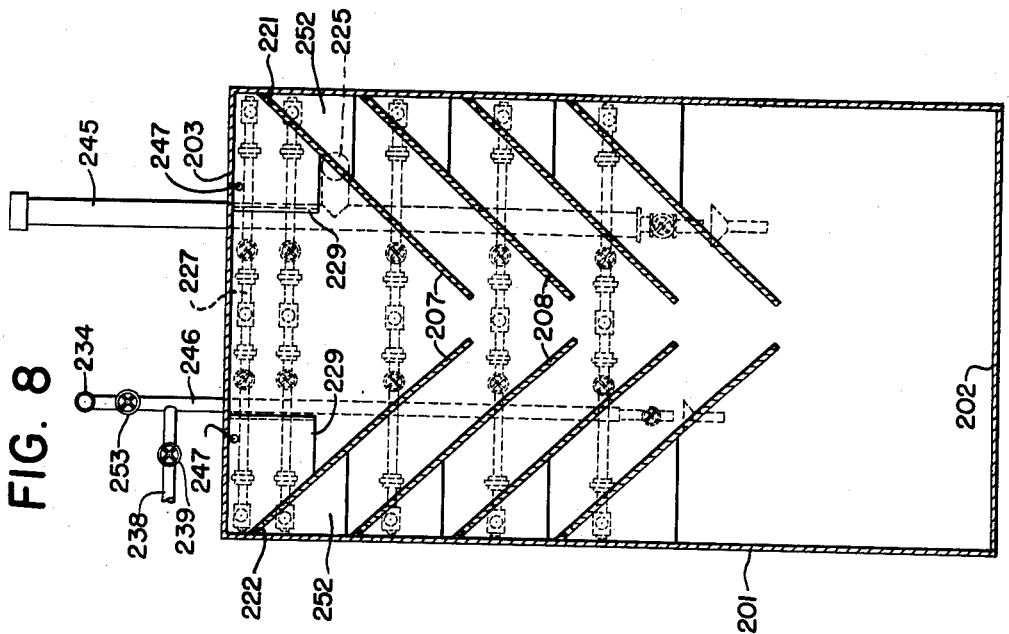
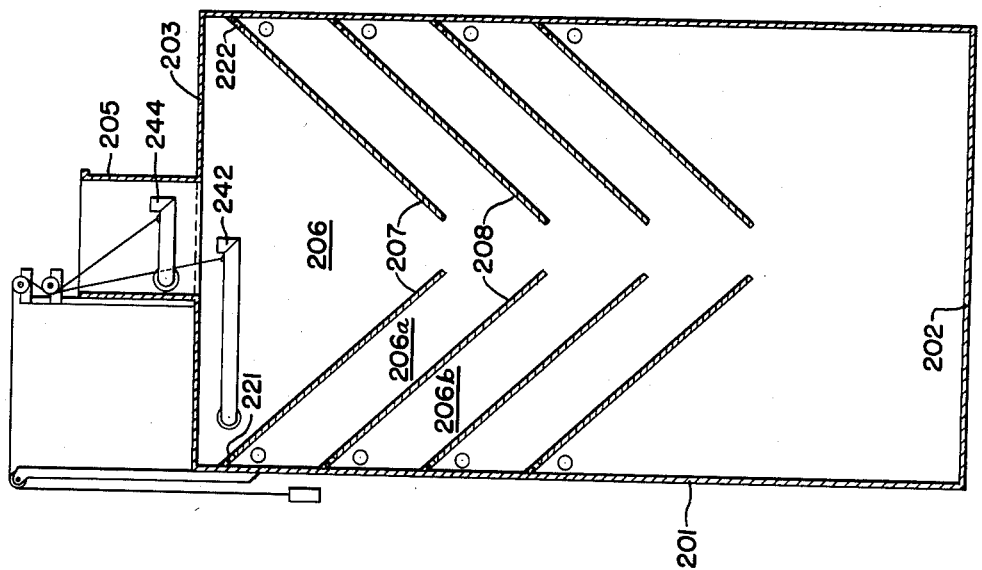

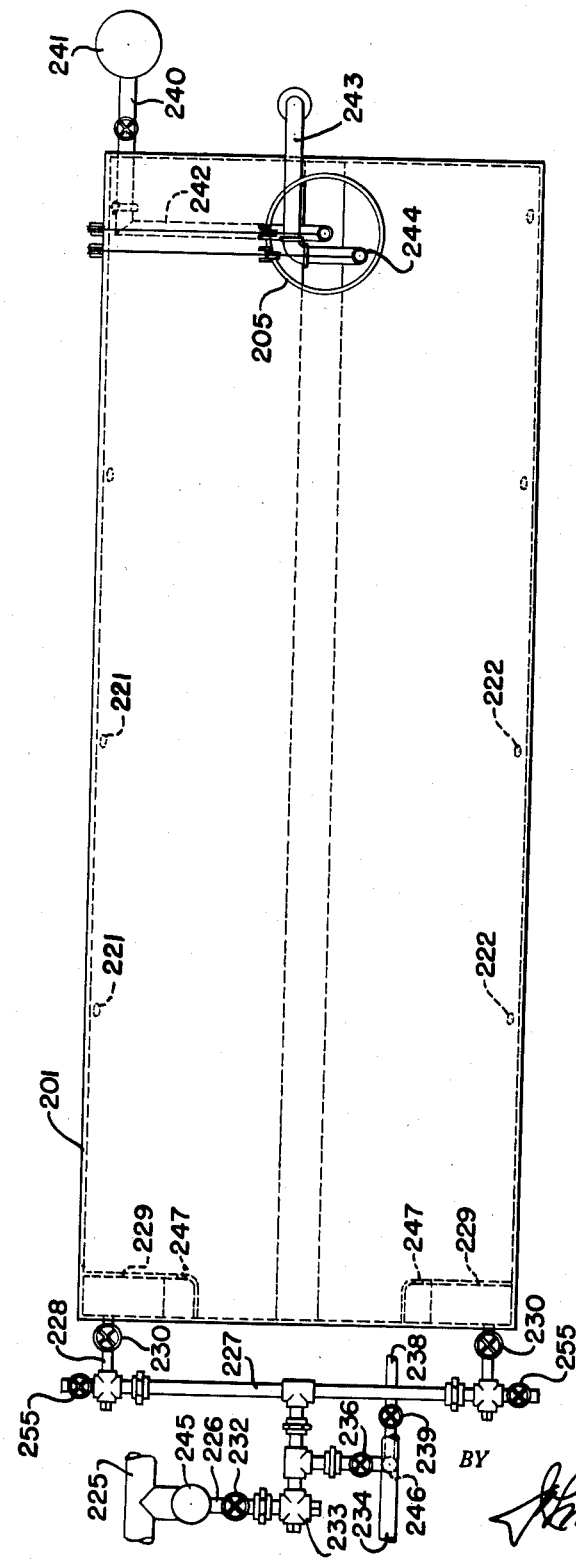

Jan. 3, 1956 — R. ESTRADA — 2,729,335
CLARIFIERS
Filed Oct. 17, 1951 — 12 Sheets-Sheet 9
FIG. 9
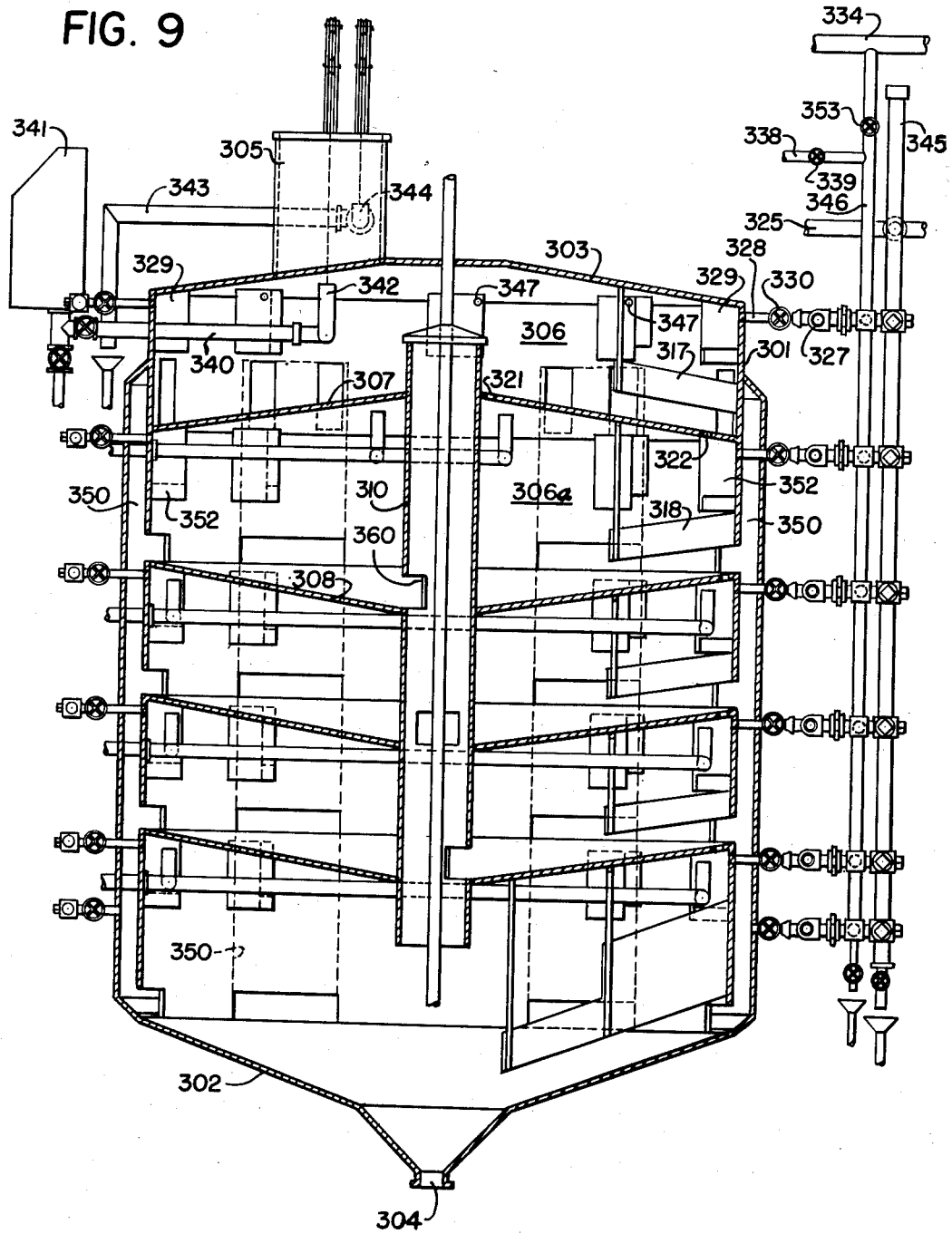
INVENTOR.
RAFAEL ESTRADA
BY 
ATTORNEY

INVENTOR.
RAFAEL ESTRADA
BY
ATTORNEY

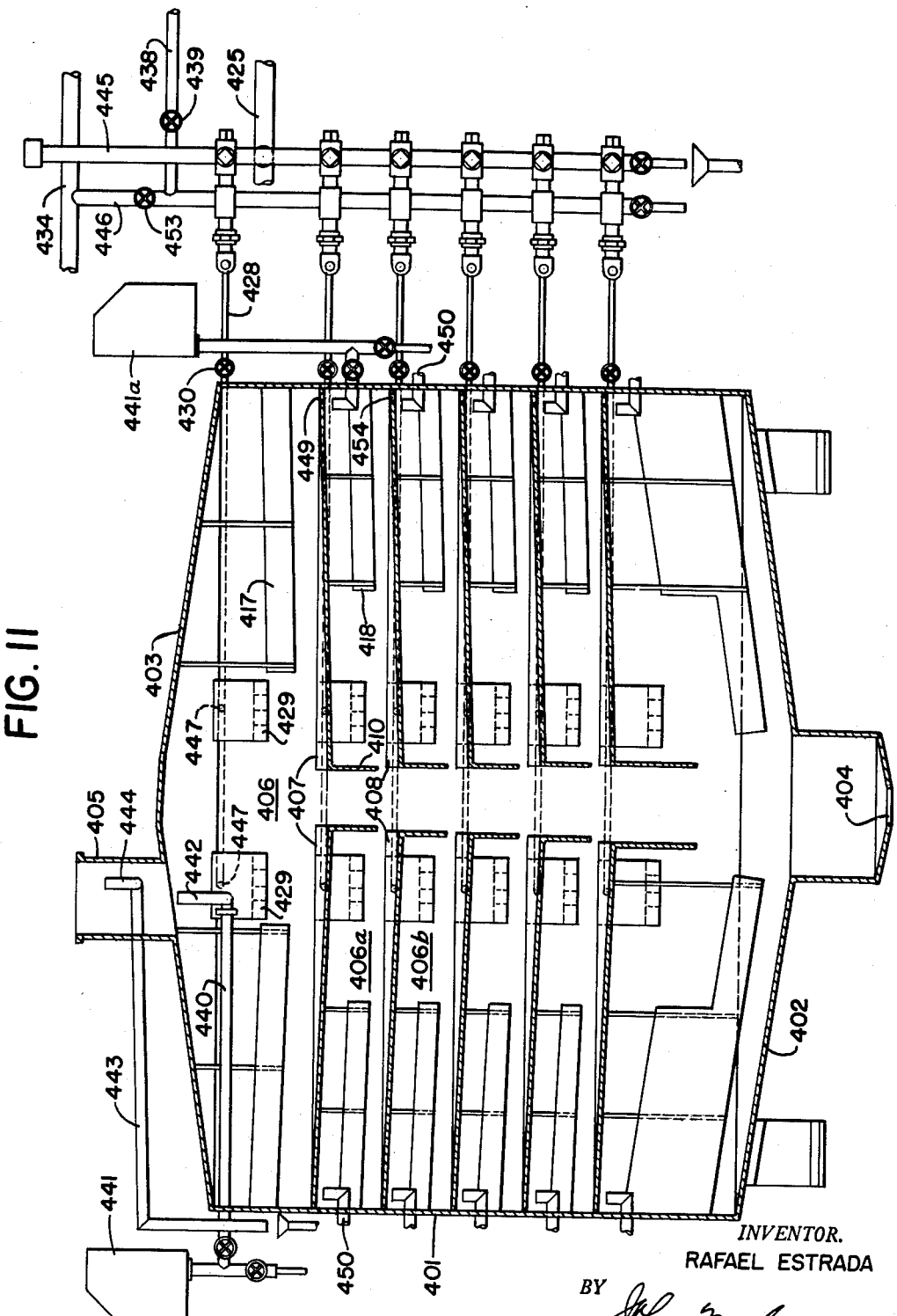

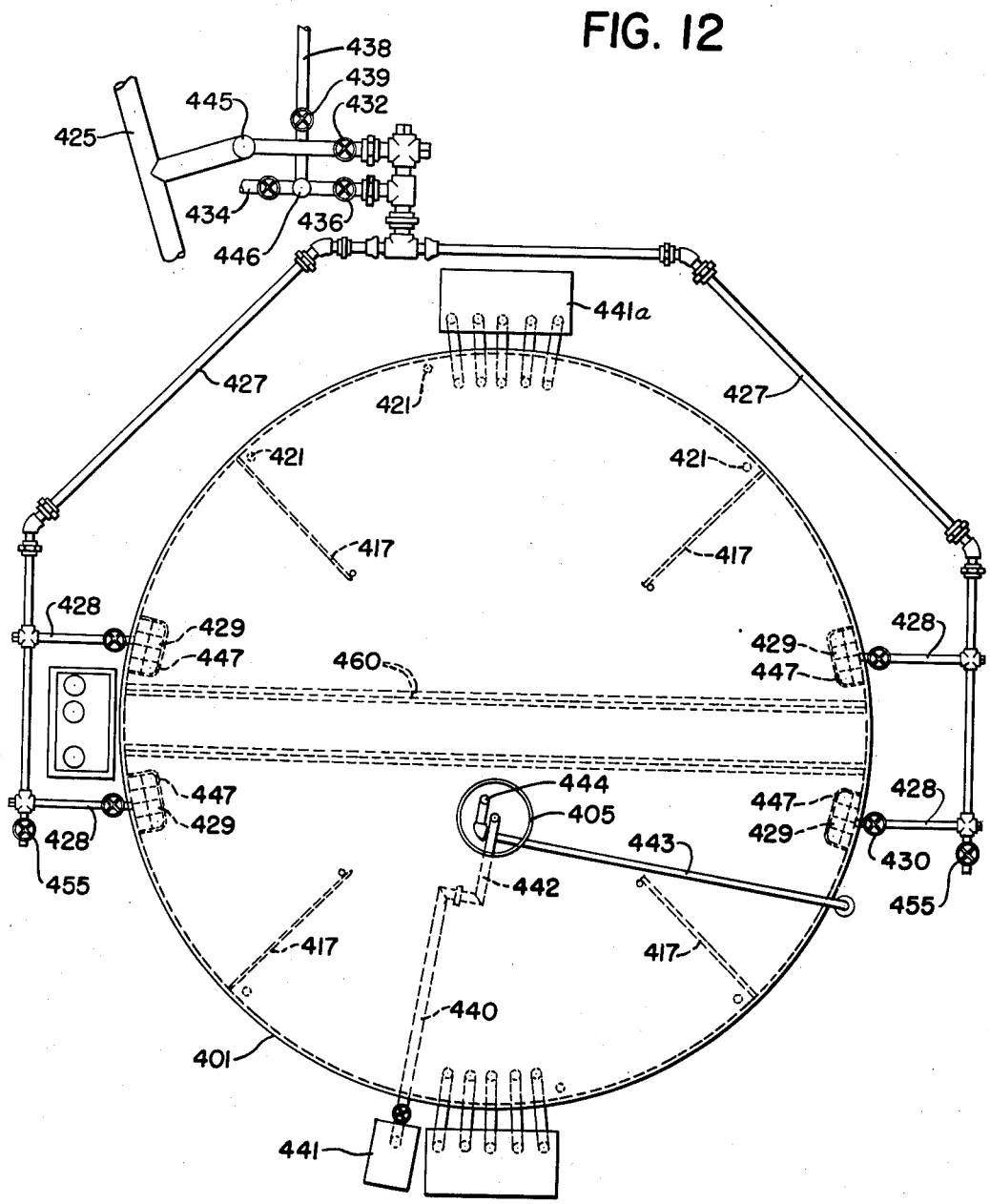

United States Patent Office 2,729,335
Patented Jan. 3, 1956

2,729,335

CLARIFIERS

Rafael Estrada, Havana, Cuba

Application October 17, 1951, Serial No. 251,800

31 Claims. (Cl. 210—55)

This invention relates to clarifiers for the clarification of liquids containing impurities in suspension, and particularly to those used in the sugar industry for the clarification of sugar cane juices.

Clarifiers for the clarification of sugar cane juices comprise a tank in which is located a plurality of substantially horizontal superimposed trays spaced apart so as to form a plurality of compartments. In clarifiers of the prior art the juice to be clarified is introduced into the top compartment which acts as the flocculation chamber for the entire clarifier, and the juice passes from the top compartment to the next lower compartment and thence from one lower compartment to the next, either through concentric openings in the successive trays or through the annular space between the periphery of the trays and the inner surface of the wall of the tank. The flocculation chamber at the top of the tank is approximately twice as large as each of the other chambers and since it is used solely for the flocculation of the juice the production capacity of the clarifier is limited to the lower compartments.

The applicant realized that by effecting the flocculation of the juice in each compartment of the clarifier instead of performing that operation in a single compartment as heretofore was done, it would be possible to increase substantially the capacity of the clarifier by utilizing the space formerly employed solely for flocculation also for clarification of the juice. The present invention resides, in part, in the provision of one or more relatively small flocculation chambers in each compartment, each having an inlet pipe connected therewith by which juice is force-fed to each chamber. The employment of flocculation chambers for each compartment permits the conversion of the former flocculation compartment into two clarifying compartments by the insertion therein of an additional tray, each compartment also having flocculating chambers upon the walls thereof.

Furthermore, in clarifiers in which flocculation takes place in a single compartment at the top of the clarifier, the flocculated juice in passing from one compartment to the next lower compartment must pass through a curtain of falling mud in order to reach the lower compartments, which obviously is detrimental to the filterability and quality of the sugar. This defect in clarifiers of the prior art is eliminated in clarifiers in which the present invention is embodied, since by the use of flocculation chambers in each compartment the juice to be flocculated and clarified is no longer required to pass through mud or sedimentation to reach the clarifying compartment.

Another object of the invention is to render each clarifying compartment independent of the others insofar as the supply of juice is concerned, this being attained by the use of flocculating chambers for each compartment, each separately fed from a source of juice.

Another feature of the invention which arises from the use of controllable means individual to each compartment for supplying juice thereto is that it permits the interruption of the supply to one or more compartments without affecting the operation of the other compartments of the clarifier.

In the supply of juice to a clarifier it is desirable to maintain high velocity through the pipes in order to prevent precipitation of the mud therein and also to scour them, but the introduction of juice at high velocity into the clarifying compartments causes agitation of the juice being clarified therein which is undesirable. The employment of individual flocculating chambers for each inlet of the juice to a compartment of the clarifier tends to eliminate such agitation.

Another object of the invention is to provide uniformity in clarity of the juice in the several compartments and likewise uniformity in quantity of the clarified juice, this being effected by the use of means to control the rate of supply of juice to each compartment.

Another object is to avoid inversion and loss of sugar by reducing to a minimum the amount of time needed for the clarification of sugar.

Another object is to permit the gases formed in each compartment to pass from one compartment to the next higher one without the use of tubes now employed for that purpose thereby eliminating a potential source of infection due to the accumulation of mud in such tubes.

The manner in which those and other objects of this invention are attained will be clearly understood from the following description when read in connection with the attached drawings in which:

Fig. 1 is a vertical section of a clarifier in which the present invention is embodied, said clarifier having a plurality of conical-shaped trays each of which slopes downwardly from the sidewall of the tnak to an opening at the center of the tray, the openings in all trays being coaxial;

Fig. 4 is a plan view of the clarifier shown in Fig. 3 showing the relative locations of the flocculating chambers in each compartment;

Figure 10:
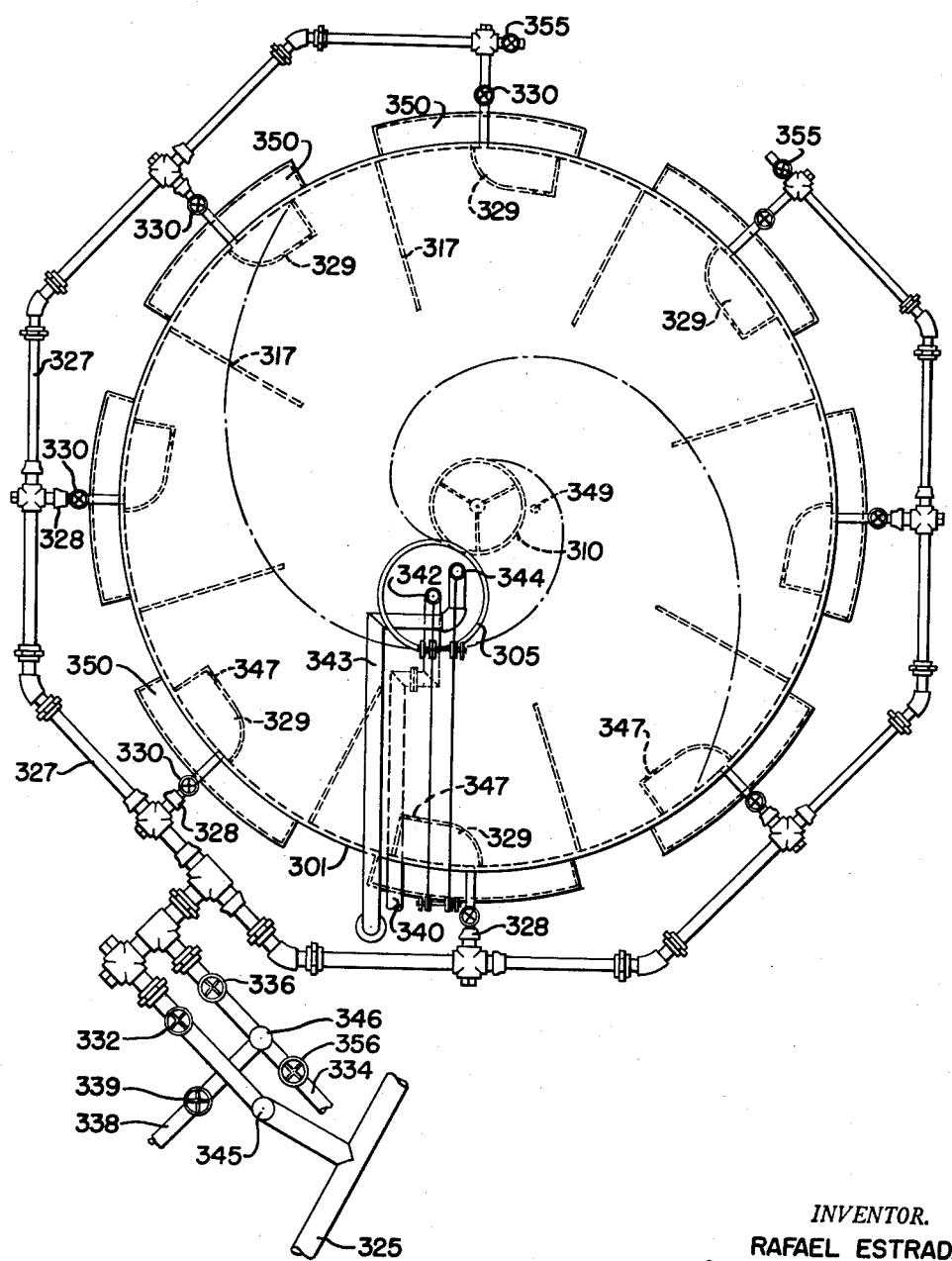

Fig. 5 is a vertical longitudinal section of a clarifier embodying the present invention having therein a plurality of trays dividing the clarifier into compartments, each tray being formed by two similar, oppositely positioned members each of which is fastened to a sidewall and also to the end walls of the body of the clarifier, said members slanting downward toward the center of the clarifier, the lower edges of the members being spaced apart to provide an elongated rectangular opening to permit the passage of mud to the bottom of the clarifier;

Fig. 6 is a vertical transverse section of the clarifier shown in Fig. 5 near the end from which the juice is drawn off;

Fig. 7 is a plan view of the clarifier shown in Fig. 5;

Fig. 8 is a vertical transverse section of the clarifier shown in Fig. 5 near the end at which the juice is introduced into the clarifying compartments;

Fig. 9 is a vertical section of a clarifier embodying the present invention having therein a plurality of trays dividing the clarifier into compartments, the uppermost tray being higher at the center than at the periphery and all of the lower trays being higher at the periphery than at the center, the periphery of all trays being in contact with the wall of the tank of the clarifier;

Fig. 10 is a plan of the clarifier shown in Fig. 9;

Fig. 11 is a vertical section of a clarifier embodying the present invention which is divided into compartments by a plurality of trays, each tray being formed in two sections of equal size, each section being the segment of a circle less than a semi-circle, the curved periphery of each section being in contact with the wall of the clarifier tank and the straight sides of said sections being parallel and spaced apart, the space being provided with a grating through which the mud passes and drops to the bottom of the clarifier.

Fig. 12 is a plan of the clarifier shown in Fig. 11.

Figure 2:
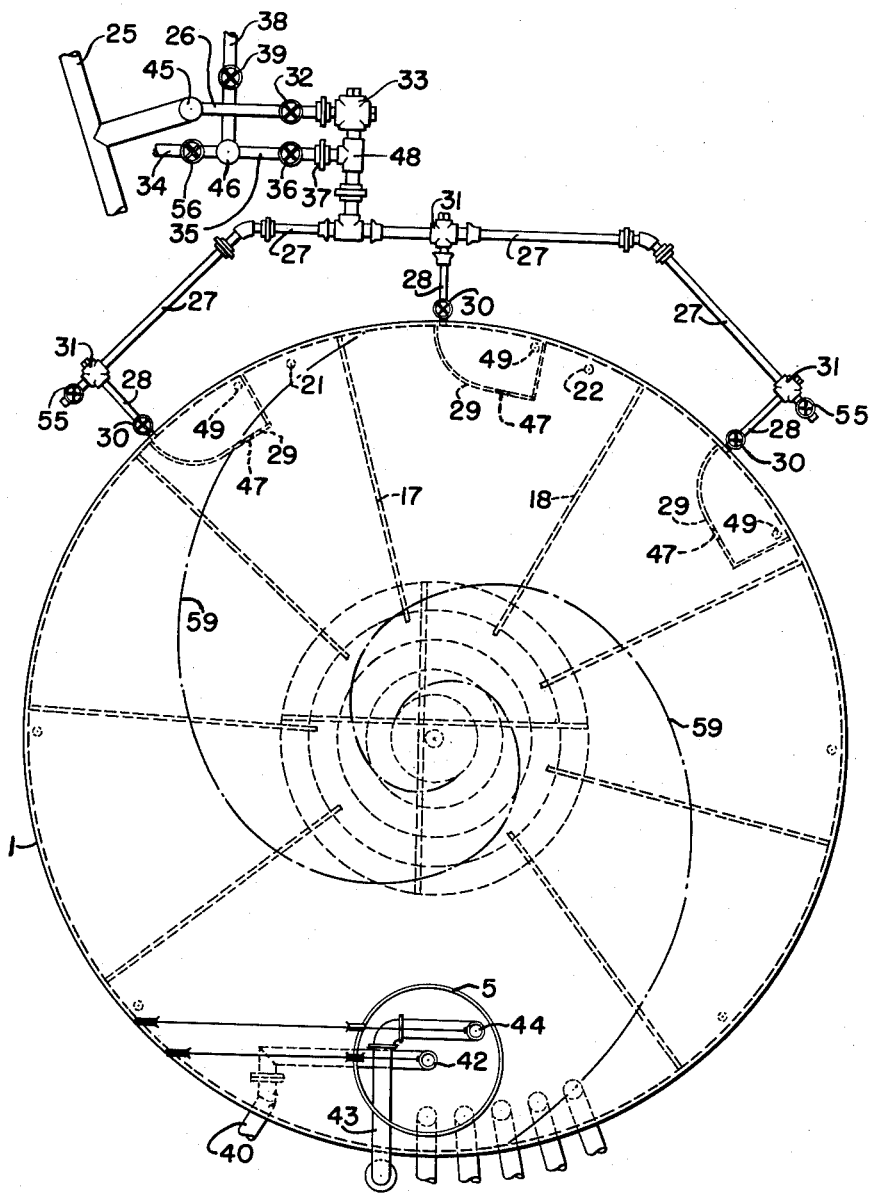
Fig. 2 is a plan view of the clarifier shown in Fig. 1 showing the relative locations of the flocculation chambers in each compartment.

The clarifier shown in Figs. 1 and 2 in which the present invention is embodied, comprises a cylindrical tank 1 having therein a bottom 2 and a top 3, the bottom having the shape of an inverted flat cone with an outlet also conical in shape and having an opening therein 4 through which mud and other sedimentation that collects in the bottom may be withdrawn. The roof 3, which may be flat, conical, or of other suitable shape, has thereon a chamber 5, opening into the body of the clarifier, the purpose of which is to collect and expel from the clarifier the scum and gases generated therein. The employment of this chamber 5 also facilitates the raising of the level of the juice in the clarifier above the level of the roof 3 thus making it possible to collect clear juice from the underside of the clarifier top 3, viz., the top of the compartment 6. The compartment 6, which in clarifiers heretofore used served merely as the flocculation chamber, may now, by virtue of my invention, be employed as a clarifying compartment whereby the capacity of the clarifier may be substantially increased.

The clarifier is divided by a plurality of trays, such as 7 and 8, into a plurality of clarifying compartments 6, 6a, 6b ... 6e, the cylindrical wall of the tank 1 forming sidewalls of all of the compartments. The inner surface of the top 3 of the clarifier forms the ceiling of compartment 6 and the floor of that compartment is provided by the tray 7. An opening 9, preferably circular, is provided in the tray 7 and concentric therewith in order to permit the discharge therethrough of mud and other sedimentation that forms upon the surface of the tray. Affixed to the tray at the opening 9 and concentric therewith is a downtake tube 10 through which the mud falls to the bottom of the clarifier. The tube 10 has fastened therein appropriately shaped deflectors 11 and 12 which prevent the rotation of the mud as it passes through the tube.

The compartment 6a is, in general, similar to compartment 6 except that the ceiling of compartment 6a is formed by the undersurface of the tray 7. The compartment 6a has therein an opening 13 with which is associated the downtake tube 14 having deflectors 15 and 16 therein. The tube 14 is preferably larger in diameter than tube 10 in order to provide for the discharge from two compartments, viz., 6 and 6a; and likewise, the downtake tube of each of the lower compartments is increasingly larger in diameter than the preceding one. In order to accelerate the movement of the sediment toward the central openings in the trays, scrapers such as those described in my copending application Serial No. 245,322, filed September 6, 1951, may be employed, such scrapers being indicated by the spiral lines 59 on Fig. 2. To reduce agitation of the juice in the compartments, baffles are provided in all compartments, such as 17 and 18 in compartment 6, which extend from the wall of the tank toward the center of the tray.

In order to permit the escape of gases from the compartments of the clarifier that are formed in the clarification process, openings are provided in all trays, such as 21 and 22 in the tray 7, and 23 and 24 in tray 8. The gases will thus escape through the openings of the higher trays in succession and eventually will be collected in the chamber 5 upon the top of the tank and will be discharged therefrom. The openings in successive trays are preferably in alignment so as to permit the passage of a cleaning tool through the correspondingly located openings in all trays thus facilitating the cleaning of those openings.

Each compartment is fed individually and independently of the others with fresh juice for clarification by a piping system extending from a source of juice to be clarified to each compartment, the system including the pipe 25 which is connected to a vertical riser 45 from which branch pipes, such as 26, extend toward the clarifier at the level of each compartment. The branch pipe 26 is connected to the distributing pipe 27, the connection including the cross 33, the T connection 48, and suitable unions which permit easy access to sections of the piping system for the purpose of cleaning them. The distributing pipe 27 is mounted at a suitable distance from the wall of the tank and extends completely or partially around the tank at the level of the compartment to be fed. The pipe 27 is connected by a plurality of branch pipes, such as 28, through which the juice is fed at high velocity to or injected into the flocculating chambers 29 attached to the inner face of the wall of the compartment to be supplied with juice, each branch pipe including a valve 30 by which the rate of flow of the juice to each of said chambers may be controlled. It is desirable that the sections of the pipe 27 be connected by unions to provide for the ready disconnection of those sections when it is necessary to clean them. It is also preferable, but not indispensable, that the connection of the branch pipes 28, and also the sections of the pipe 27, be made by means of crosses, such as 31, to facilitate the cleaning of the connected pipes without disconnecting them from the piping system. It is also desirable that the diameters of the sections of the pipe 27 decrease proportionally in both directions from the point at which the juice enters the distributing pipe 27. This ensures the attainment of more uniform feeding of the juice to the flocculation chambers upon the wall of the compartment being fed. The branch feed pipe 26 has therein a valve 32 to control the supply of juice to the distributing pipe 27.

In order to clean the piping, water may be supplied through the pipe 34 which is connected to a riser 46 from which branch pipes, such as 35, extend to the piping system 27, the connection including a valve 36 and the union 37. In order to facilitate the cleaning, steam may be supplied through the pipe 38 which is connected to the riser 46, the pipe 38 having a valve 39 therein to control the supply of steam. The closing of the valves 30 and 32 in the piping system extending from the vertical riser 45 to a compartment permits the isolation of that section of piping from other parts of the system; then by opening the valve 53 in the riser 46 and the valves 36 and 55 while keeping valve 39 closed, the isolated piping may be flushed with water. When steam is required for cleaning, the valve 53 is closed and the valves 39, 36 and 55 are opened. If further cleaning is necessary, the pipes may be readily disassembled and scraped.

As mentioned, each of the branch feeders 28 is connected to one of the flocculating chambers 29 from which the juice is discharged through suitable openings into the clarifying compartment. By the way of illustration, but without limitation, several forms of flocculating chambers are shown in the drawings. In Fig. 2 there is shown in plan view a type of chamber from which the juice is discharged into the clarifying compartment through an opening 60 (Fig. 1) in the bottom and one of the sides of the flocculation chamber. Chambers of this type are approximately two feet wide, twelve inches deep (from back to front), and sixteen inches high. Another type, which is shown in plan view in Fig. 12, has the same width and depth as the type shown in Fig. 2 but has the height of approximately twenty-one inches. The type shown in Fig. 12 is divided into a plurality of compartments and discharges the flocculated juice through the bottom. It is to be understood that the proportions stated are merely illustrative and constitute no limitation upon the invention. These chambers are provided with perforations such as 47 and 49 in the side or the top of the chamber for discharging gases that may accumulate therein. These chambers not only effect the flocculation of the juice but also serve to cut down its velocity before entering the clarifying chamber, thus reducing the amount of disturbance of the juice in the compartment.

The take-off or extraction of the clarified juice from each compartment is accomplished by means of the pipes 40, 50, etc., in the usual manner, the juice passing through said pipes to the clear juice box 41. In the uppermost compartment the extraction pipe 40 is equipped with a movable arm 42 to permit adjustment of the extraction level as desired. Extending from the chamber 5 is an extraction pipe 43 to carry off the scum that collects in the chamber, the pipe being equipped with a movable arm 44 for the adjustment of the mouth of the pipe to the level of the liquid in the chamber. The exterior source of juice that is supplied to the clarifier may be of any desirable kind or shape and, furthermore, it is possible to use more than one source without affecting the operation of the clarifier.

Figure 3:
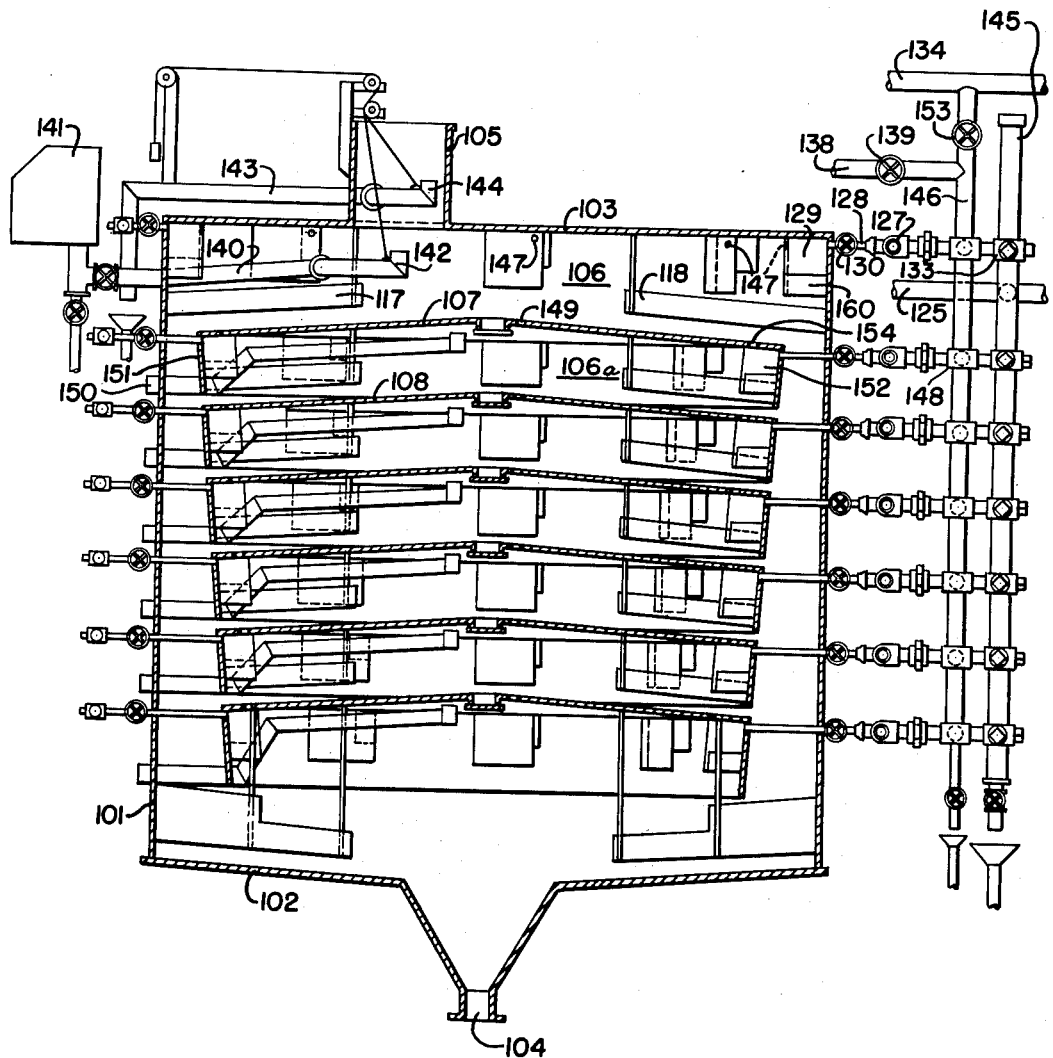
Fig. 3 is a vertical section of a clarifier embodying the present invention having a plurality of trays therein, each of the trays sloping downwardly from the centers thereof to the periphery which is adjacent to but not in contact with the wall of the clarifier, thus leaving an annular space between the trays and the wall.

Figs. 3 and 4 show the application of my invention to another type of clarifier. As there shown the clarifier comprises a tank 101 having a bottom 102 with an opening 104 at the lower end of a conical portion of the bottom through which mud may be withdrawn. The tank also has a top 103 upon which is located a chamber 105, opening into the tank, for the collection of gas and scum. Connected with this chamber is an extraction pipe 143 having a movable arm connected thereto within the chamber 105 for the purpose of adjusting the orifice of the pipe to the level of the scum within the chamber. In this type of clarifier the trays, such as 107, are higher at the center than at the periphery thereof. The periphery of each tray is not contiguous with the inner surface of the tank as in the form shown in Figs. 1 and 2 but is spaced therefrom, and the spacing provides an annular opening for discharge of mud and sedimentation which in the type of clarifier shown in Figs. 1 and 2 is afforded by the central opening in the trays. Attached to each tray at the periphery thereof is a downwardly extending flange such as 151 which serves as a wall for the next lower compartment. Since the trays diminish in diameter progressively from top to bottom the space between the wall of the tank and the flanges likewise increases from top to bottom, which is comparable to the increase in size of the downtake tubes shown in Fig. 1. The ceiling of the upper chamber 106 is provided by the top 103 of the tank, and the floor of that chamber is provided by the tray 107. Attached to the inner surface of the wall of the tank and at or near the top thereof is a plurality of flocculating chambers 129 spaced apart at substantially equal distances as shown in Fig. 4. These chambers serve to provide flocculated juice to the uppermost compartment 106. In chamber 106a and those beneath it, the flocculating chambers, such as 152, are positioned on the inner side of the flange which forms, in effect, the wall of the compartment. Each chamber is also provided with a plurality of baffles 117 and 118 and preferably would be provided with scrapers, such as 159 (Fig. 4) of the type hereinbefore referred to which would be operated in such direction as to sweep the sediment to the periphery of the tray and thereby cause it to fall to the bottom of the tank through the passageway between the trays and the wall of the tank 101.

The uppermost tray has connected thereto an extraction pipe 140 by means of which the clarified juice from this compartment may be conveyed to the juice box 141. The extraction pipe 140 has a movable arm 142 to permit the adjustment of the mouth of the pipe to the level of the clear juice in the compartment. Each of the remaining compartments has also an extraction pipe, such as 150 in compartment 106a, for withdrawal of the clarified juice. A piping system for the distribution of juice to be clarified is provided, which, in general, is similar to that previously described in connection with Figs. 1 and 2, but differs therefrom in that in the piping systems of Figs. 3 and 4 the branch pipes extend not only through the wall of the tank but, in the case of the lower compartments, extend also through the flanges, such as 151, upon the tray 107 in order to reach the flocculating chambers, as 152, therein. Juice to be clarified is fed by the pipe 125 to the riser 145 from which it passes to the distributing pipe 127 and thence through the branch pipes 128 to the flocculating chambers 129, assuming, of course, that the valves in those pipes are open. For cleaning the piping system water is supplied through the pipe 134 to a riser 146 and steam is supplied to the riser through the pipe 138, both pipes containing valves to control the flow.

Figure 2A:
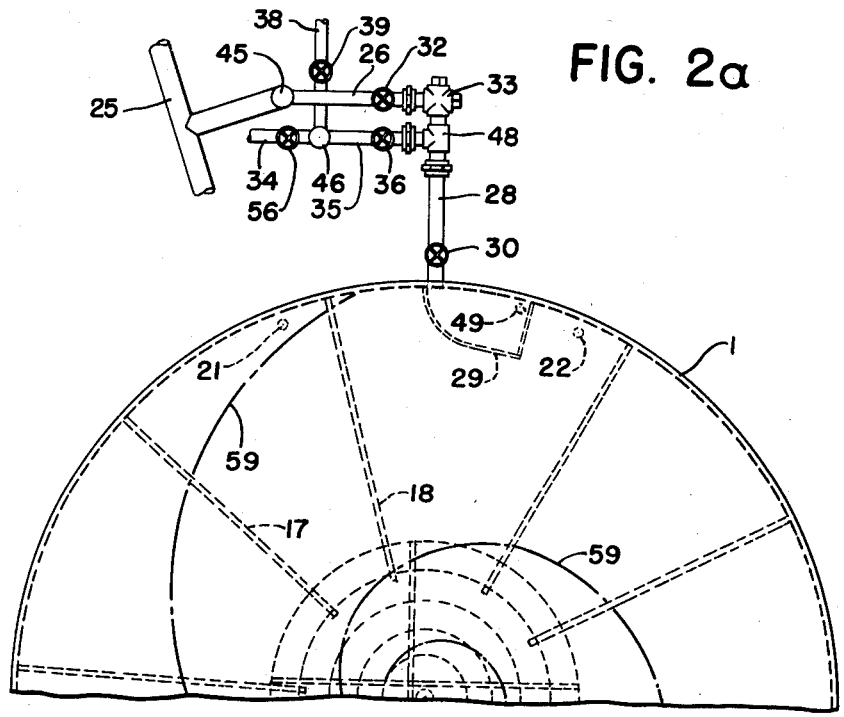
Fig. 2A is a fragment of the plan shown in Fig. 2, illustrating the use of a single flocculation chamber for each compartment instead of three such chambers shown in Fig. 2.
Figure 4A:
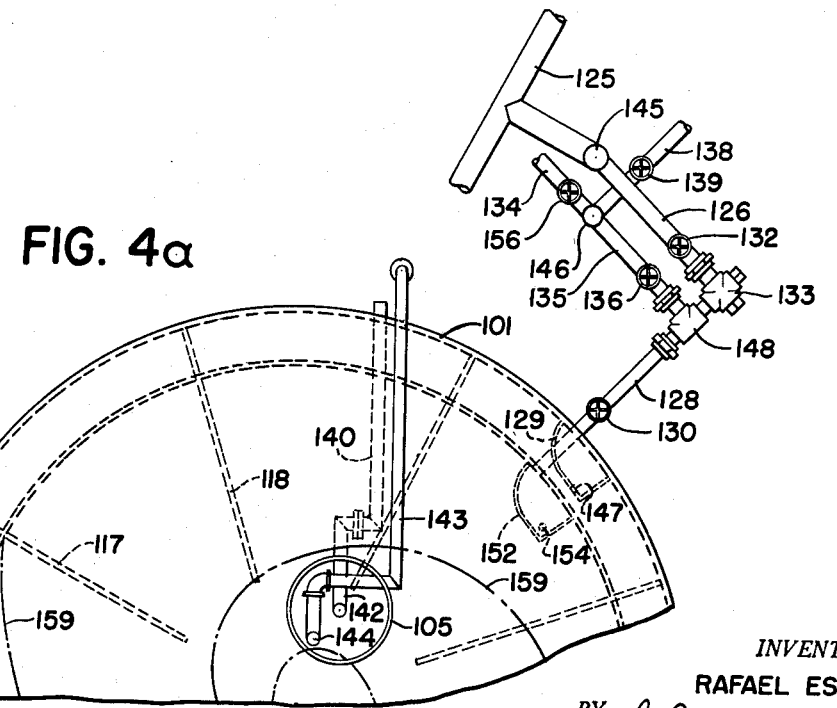
Fig. 4a is a fragmentary view of the plan shown in Fig. 4 illustrating the use of a single flocculation chamber in each compartment.

Instead of employing three flocculating chambers as shown in Fig. 2, and eight such chambers as shown in Fig. 4, it may be found desirable or satisfactory to employ in each compartment a single flocculation chamber. Fig. 2a shows the use of a single chamber in each compartment in the type of clarifier shown in Fig. 2; and Fig. 4a shows the use of a single chamber in each compartment of the type shown in Fig. 4. Since Fig. 4a is a plan of the clarifier it will be understood, of course, that the inlet pipe there shown extends into the chamber 129 and a similar pipe beneath and in line with the inlet pipe there shown extends into the flocculating chamber 152.

The type of the clarifier shown in Figs. 5 to 8, inclusive, differs from those previously shown in that it is rectangular in form with walls 201, a floor 202, and a roof 203. Within the body of the clarifier are compartments, such as 206, 206a, etc., each of which is formed by a plurality of pairs of trays, such as 207 and 208 (Figs. 6 and 8), each of which trays slants downwardly from the point of attachment of the tray to the sidewall and end walls of the tank 201. As shown in those figures, the trays of each pair do not touch at their lower extremities but are proportioned and positioned to provide a space between their lower extremities so as to permit mud and other sediment to fall therethrough to the bottom of the tank. The angle of inclination of the trays is such that the mud that settles upon them slides down and falls to the bottom of the tank through the open spaces. This makes unnecessary the use of scrapers. The bottom of the tank forms a trough in which the mud collects and an endless screw (not shown) working in said trough expels it through a suitable port. Each compartment has therein two flocculating chambers, such as 229, each of which is individual to and associated with one of the trays of a pair of trays forming a compartment. Each flocculating chamber is connected to an inlet pipe which passes through the wall of the clarifier tank, this inlet pipe being connected to a piping system that is in general similar to that described in connection with the preceding figures.

In the form of the invention shown in Figs. 5 to 8, inclusive, the juice to be clarified is supplied to the clarifier through the pipe 225 (which is connected to the riser 245) and then passes through the branch pipe 226 and the distributing pipe 227 to two flocculation chambers 229 in each of the compartments, as indicated in Fig. 5. This piping system for the feeding of the compartments is provided with suitable valves, 230 and 232, to regulate the distribution of the juice to be clarified, and, as in the preceding forms of the invention, each compartment is thus rendered independent of the other compartment insofar as it concerns the supply thereto of the juice to be clarified. Each compartment has therein at its discharge end a discharge pipe, such as 240, 250, by which the clarified juice may be drawn off. The level of the intake of the discharge pipe 240 in the uppermost compartment is adjustable but the level of the intake of the pipes, such as 250, in the other compartments, is fixed. Each of the slanting trays has thereon a plurality of small openings, such as 221 and 222, positioned close to the upper edge of the tray to permit the passage of gas through successive clarifying compartments until it reaches the uppermost chamber 205 positioned upon the top of the clarification tank, and opening into the tank, where the gas and also scum will be collected and discharged through the movable discharge pipe 244. Water and steam for cleaning the piping system are provided, water being supplied by the pipe 234 which is connected to the riser 246, and steam is supplied to the riser by the pipe 238, the pipes having therein the valves 256 and 239, respectively, as shown clearly in Fig. 5, for controlling the flow during the cleaning process, in the manner heretofore explained in the description of Figs. 1 and 2.

Figs. 9 and 10 show another form of clarifier in which the present invention is embodied. This clarifier comprises a tank 301 having a roof 303 thereon, and a bottom 302 from which extends a discharge pipe 304 for the removal of mud that collects therein. Mounted upon the roof and opening into the uppermost compartment is a chamber 305, which performs the same functions as the chambers shown in the preceding types of clarifiers, namely, it permits the elevation of the liquid level in the uppermost compartment 306 above the level of the roof thus making it possible to collect clear liquid from the underside of the roof 303 and also serves to collect and expel scum and gases generated in the clarifier. The employment of this chamber contributes to the use of that uppermost compartment as a clarifying compartment instead of a flocculation chamber, which was its former purpose, thus greatly increasing the capacity of the clarifier.

The tank 301 is divided into a plurality of compartments 306, 306a, etc., the uppermost compartment 306 being higher at the center than at the periphery, and the lower compartments being lower at the center than at the periphery. Each of the trays 307, 308, etc., has therein an opening at the center, all said openings being coaxial and through said openings extends a hollow vertical column 310, closed at the top and open at the bottom, which extends from a point within the uppermost compartment 306 to a predetermined distance within the lowest compartment which is used as a mud compartment. This column, which is arranged to rotate, has therein a plurality of openings, as 360 (except the uppermost and the lowest compartments), the lower edge of said openings being at the level of the trays. The sedimentation that collects upon the trays passes through the openings and falls to the bottom of the lowest compartment of the clarifier. In this type of clarifier, as originally designed and used, the juice to be clarified was fed to the uppermost compartment which served as the flocculation chamber for the entire clarifier. After flocculation, the juice flowed into vertical passageways 350 which were formed like blisters upon the outer wall of the clarifier tank 301. Openings were provided between the passageways 350 at the level of the periphery of each tray and the juice to be clarified was thereby introduced into each compartment. Since, as will presently be made clear, the present invention renders unnecessary the use of the vertical passageways 350 for the feeding of juice, they are now employed to carry off the sedimentation that forms upon the outwardly sloping floor of the uppermost compartment 306 which now serves as a clarifying compartment.

Each of the clarifying compartments 306, 306a, etc., is fed directly and independently of other compartments with fresh liquid for clarification by a feeding device similar to those previously described, the device consisting of a distributing pipe 327 (Fig. 10) that is connected by branch pipes 328 into flocculation chambers 329 which are distributed preferably uniformly around the inner surface of the wall of each compartment. The distributing piping 327, which extends around the clarifier tank as shown in Fig. 10, receives juice from the pipe 325 and distributes the juice to the inlet pipes 328 connected to the flocculation chambers. It is to be understood, of course, that a distributing piping system similar to 327 is provided for each compartment in the tank, all of which distributing pipes would preferably be connected to the same source of juice, but, if desired, the different compartments could be supplied by different sources. Each branch pipe 328 has a valve 330 therein to regulate the supply of juice to each flocculation chamber. This distributing system, like those previously described, is made up of a plurality of straight sections of pipe connected by unions, or crosses, which permit them to be readily uncoupled for the purpose of cleaning. Water and steam for cleaning the pipes are provided, water being supplied by the pipe 334 which is connected to the riser 346, the connection including the valve 353, and steam is supplied to the riser by the pipe 338, the connection including the valve 339, and the mode of cleaning is the same as that previously described.

Figs. 11 and 12 illustrate another type of clarifier in which this invention is embodied. The clarifier there shown comprises a tank 401 having a top thereon 403 and a bottom 402 to which is connected a discharge chamber having an opening 404 through which the sedimentation may be withdrawn. Attached to the roof and opening into the uppermost compartment 406 is a chamber 405 which, as in the other types of clarifiers hereinbefore described, serves to collect gases and scum from the clarification process and also serves to permit the level of clarified liquid in the uppermost chamber to rise above the level of the roof of the clarifier thereby permitting the removal of clear juice from the underside of the top 403 of the tank. The tank is divided into a plurality of compartments 406, 406a, by a plurality of superimposed trays such as 407, 408, etc., each of which is divided into two sections similar in shape and equal in size, each section being a segment of the inner circular area of the tank but less than a semi-circle, the curved periphery of each section being in contact with the wall of the tank, and the straight sides of said sections being parallel as shown clearly in Fig. 12 so as to provide a longitudinal opening 460 across the tray through which mud may be discharged. Fastened to the underside of each section of a tray and in line with the edge of the opening is a flange such as 410 which serves to guide the mud in falling from the compartment to the bottom of the tank. This opening between the sections of the tray is covered with a grill which, for example, may be of either of the types shown in Figs. 8, 9 and 10 of the applicant's copending application, Serial No. 245,322, filed September 6, 1951. Fastened to the wall of each compartment is a plurality of flocculating chambers such as 429 into which the juice to be clarified is fed by the branch pipes 428 which are connected to the distributing pipe 427 to which juice is supplied from the pipe 425 which is connected to the source of the juice. While only four flocculating chambers are shown in Fig. 12, it is to be understood that the number may be greater or less than that. Each compartment has therein a discharge pipe such as 440, 450, by means of which the clarified juice may be withdrawn, the pipe 440 in compartment 406 being arranged to have the level of its intake orifice adjusted. The sedimentation deposited upon the trays may be moved to the grill across the opening in the tray and caused to fall therethrough by means of the scraper shown in my copending application, Serial No. 245,322, filed September 6, 1951. Each compartment has therein a plurality of baffles, such as 417 and 418, to prevent undue agitation of the liquid being clarified by the operation of the scrapers.

Each compartment is fed with raw juice directly and independently of the other compartments, as shown clearly in Fig. 11, so that the supply of juice to any compartment may at any time be terminated without affecting the supply of juice to the other compartments. As in the piping arrangements shown in the other figures, means are provided in the piping system of Figs. 11 and 12 to supply water and steam for cleaning the pipes through which the juice passes, water being supplied by the pipe 434 and steam by the pipe 438, both connected to a riser 446, the connections including the valves 453 and 439, respectively, as shown in Fig. 11.

By the use of flocculating chambers in each compartment as provided by the present invention, the uppermost chamber which formerly served merely as a flocculating chamber for the entire clarifier may now be used as a clarifying chamber thereby substantially increasing the juice-settling area and thus increasing the capacity of the clarifier.

The use of this invention also increases the thickness of the cachaza and likewise decreases the frequency and duration of cloudy juice periods. Furthermore, it ensures the production of juices of the same clarity from all compartments.

As shown in Figs. 1 and 2, and similarly in other figures of the drawing, means are provided to effect the adjustment of the position of the movable arms 42 and 44 of the extraction pipes 40 and 43, respectively, and to maintain them in any desired position. The means shown consist in a rope or cable, one end of which is attached to a movable arm and the other end has a counter-balancing weight attached thereto, the rope extending over suitably positioned grooved wheels. It is to be understood that such arrangement is merely illustrative and that other means may be employed which are within the scope of the present invention.

It is to be understood that the terms and expressions which I have employed are used as terms of description and not of limitation and it is not intended that in the use of such terms and expressions to exclude any equivalents of the features shown and described herein or any portions thereof.

While this invention has been disclosed in particular forms and arrangements thereof, it is to be understood that it is capable of embodiment in other forms and arrangements without departing from the spirit and scope of the appended claims.

What is claimed is:

1. Means to clarify a liquid containing matter in suspension comprising, in combination, a tank having a top and a bottom, a plurality of trays supported in said tank and spaced from each other to provide a plurality of clarifying compartments therein, means for flocculating said liquid and forming a plurality of discrete flocculating chambers at least one for each of said compartments, each of said flocculating chambers communicating with one of said compartments, means for injecting liquid containing matter in suspension to be flocculated into each of said flocculating chambers, said chambers being designed and proportioned to reduce the velocity of the liquid passing therethrough, thereby minimizing the disturbance of the liquid then being clarified in the compartments.

2. The structure defined by claim 1 further characterized by the inclusion of a duct individual to each compartment to withdraw the clarified liquid therefrom.

3. The structure defined by claim 1 further characterized by the addition of means forming a chamber for the collection of gases and to permit the liquid in the uppermost compartment to rise to the level of the ceiling thereof, said last mentioned means being positioned upon the roof of said tank and forming a chamber opening into said uppermost compartment.

4. The structure defined by claim 1 further characterized by the addition of means forming a chamber for the collection of gases and to permit the liquid in the uppermost compartment to rise to the level of the ceiling thereof, said collection chamber being positioned upon the roof of said tank and opening into said uppermost compartment, and means for withdrawing scum from the liquid rising in the collection chamber.

5. The structure defined by claim 1 further characterized by the inclusion of one or more vents in each of said trays to permit the passage from one compartment to another of gases formed during the clarification process, said vents being positioned near the highest level of each tray, the vents in the several trays being similarly positioned therein.

6. Means to clarify a liquid containing matter in suspension comprising, in combination, a tank having a top and a bottom, a plurality of trays supported in said tank and spaced from each other to provide a plurality of clarifying compartments therein, means for flocculating said liquid and forming a plurality of discrete flocculating chambers for each of said compartments and communicating therewith, means for injecting liquid containing mater in suspension into each of said flocculating chambers and connecting the same to a common source of supply of the liquid to be flocculated, and last mentioned means including means to control the rate of flow of the liquid into each of said flocculating chambers whereby the quantity of liquid supplied to any compartment is rendered independent of the quantity of liquid supplied to other compartments.

7. The structure defined by claim 6 further characterized by the inclusion of a duct individual to each compartment to withdraw the clarified liquid therefrom.

8. The structure defined by claim 6 further characterized by the inclusion of a duct individual to each compartment to withdraw the clarified liquid therefrom, the duct in the uppermost compartment having its intake adjustable to the level of the clarified liquid therein.

9. Means to clarify a liquid containing matter in suspension comprising, in combination, a tank having a top and a bottom, a plurality of trays supported in said tank and spaced from each other to provide a plurality of clarifying compartments therein, the periphery of each of said trays being contiguous to the wall of said tank and each tray having an opening in the center for the discharge of sedimentation, all said openings being coaxial, means for flocculating said liquid including means forming with said tank a plurality of flocculation chambers spaced peripherally about each of said clarifying compartments, means for injecting said liquid into each of said flocculation chambers, said chambers each having an opening therein through which the liquid passes to its clarifying compartment, said chambers being designed and proportioned to reduce the velocity of the liquid passing therethrough to minimize the disturbance of the liquid then being clarified in the compartment.

10. The structure defined by claim 9 further characterized by the inclusion of a duct individual to each compartment to withdraw the clarified liquid therefrom.

11. The structure defined by claim 9 further characterized by the inclusion of means individual to each compartment to withdraw the clarified liquid therefrom, the withdrawing means in the uppermost compartment having its intake adjustable to the level of the clarified liquid therein.

12. The structure defined by claim 9 further characterized in that the bottom of each tray slopes from its periphery to the central opening therein.

13. The structure defined by claim 9 further characterized in that the bottom of each tray slopes from its periphery to the central opening therein and by the inclusion in each compartment of a scraper supported by a rotatable shaft positioned within the central opening in each tray to move the sedimentation to the central opening.

14. Means to clarify a liquid containing matter in suspension comprising, in combination, a tank having a top and a bottom, a plurality of trays supported in said tank and spaced from each other to provide a plurality of clarifying compartments therein, the bottom of each tray sloping toward a central opening for the discharge of sedimentation, a scraper supported by a rotatable shaft positioned within said central opening in each tray to move the sedimentation thereon to said central opening, a baffle associated with each compartment to minimize the disturbance of the liquid therein by the removal of the sedimentation, and means forming a plurality of spaced flocculation chambers in each of said compartments, each of said flocculation chambers having an opening through which flocculated liquid passes into the compartment associated therewith, and a plurality of inlet pipes one connected to each of said flocculation chambers.

15. The structure defined by claim 14 further characterized by the inclusion of means individual to each compartment to withdraw the clarified liquid therefrom.

16. The structure defined by claim 14 further characterized by the inclusion of a duct individual to each compartment ot withdraw the clarified liquid therefrom, the duct in the uppermost compartment having its intake adjustable to the level of the clarified liquid therein.

17. Means to clarify a liquid containing matter in suspension comprising, in combination, a tank having a top and a bottom, a plurality of trays supported in said tank and spaced from each other to provide a plurality of compartments therein, the bottom of each of said trays sloping from the center toward the periphery thereof, each tray being spaced from the wall of the tank to provide a passageway for sedimentation, means for flocculating said liquid and forming a plurality of discrete flocculating chambers at least one in and communicating with each of said compartments, and means including an inlet pipe for injecting liquid containing matter in suspension to be flocculated into each of said flocculating chambers.

18. The structure defined by claim 17 further characterized by the inclusion of a valve in each of said inlet pipes to control the rate of supply of liquid to each chamber.

19. The structure defined by claim 17 further characterized by the inclusion of a valve in each of said inlet pipes to control the rate of supply of liquid to each chamber and also by the inclusion of means individual to each compartment for the withdrawal of clarified liquid therefrom.

20. The structure defined by claim 17 further characterized by the inclusion of means individual to each compartment for the withdrawal of clarified liquid therefrom.

21. Means to clarify a liquid containing matter in suspension comprising, in combination, a tank having a top and a bottom, the longitudinal and transverse vertical cross-sections of which are rectangular, a plurality of trays in said tank to form a plurality of compartments therein each tray comprising two similar rectangular members, each member being so supported within the tank as to slope toward the center of the tank and being so proportioned and positioned that the lower edges of the members of each pair constituting a tray are spaced apart to provide a passageway for sedimentation moving downwardly from each of said members, means for flocculating said liquid and forming a plurality of discrete flocculating chambers at least one in and communicating with each of said compartments, and means including an inlet pipe for injecting liquid containing matter in suspension to be flocculated into each of said flocculating chambers.

22. The structure defined by claim 21 further characterized by the inclusion of a valve in each of said inlet pipes to control the rate of supply of liquid to each chamber.

23. The structure defined by claim 21 further characterized by the inclusion of a valve in each of said inlet pipes to control the rate of supply of liquid to each chamber and also by the inclusion of means individual to each compartment for the withdrawal of clarified liquid therefrom.

24. The structure defined by claim 21 further characterized by the inclusion of means individual to each compartment for the withdrawal of clarified liquid therefrom.

25. Means to clarify a liquid containing matter in suspension comprising, in combination, a tank having a top and a bottom and also having a plurality of trays therein each spaced from the other to provide a plurality of compartments therein, the periphery of each tray being in contact with the wall of said tank, the uppermost tray sloping from the center to the periphery thereof and each of the remaining trays sloping from its periphery to the center thereof, each tray having an opening in the center thereof, said openings being concentric, a tubular column extending through said concentric openings having windows therein opening into all compartments except the uppermost, a plurality of vertical passageways fastened to the outer surface of the wall of said tank, said passageways having openings therein leading to each of said compartments, means for flocculating said liquid and forming a plurality of discrete flocculating chambers at least one in and communicating with each of said compartments, and means including an inlet pipe for injecting liquid containing matter in suspension to be flocculated into each of said flocculating chambers.

26. The structure defined by claim 25 further characterized by the inclusion of a valve in each of said inlet pipes to control the rate of supply of liquid to each chamber.

27. The structure defined by claim 25 further characterized by the inclusion of a valve in each of said inlet pipes to control the rate of supply of liquid to each chamber and also by the inclusion of means individual to each compartment for the withdrawal of clarified liquid therefrom.

28. The structure defined by claim 25 further characterized by the inclusion of means individual to each compartment for the withdrawal of clarified liquid therefrom.

29. Means to clarify a liquid containing matter in suspension comprising, in combination, a tank having a top and a bottom and also having a plurality of trays therein each spaced from the other to provide a plurality of compartments therein, each tray being formed in two sections of equal area, each section being the segment of a circle less than a semi-circle, the curved periphery of each section being in contact with the wall of the tank and the straight sides of said sections being parallel, the space between the sides of the sections providing a passageway for sedimentation formed upon the bottoms of the trays, means for flocculating said liquid and forming a plurality of discrete flocculating chambers at least one in and communicating with each of said compartments, and means including an inlet pipe for injecting liquid containing matter in suspension to be flocculated into each of said flocculating chambers.

30. The structure defined by claim 29 further characterized by the inclusion of a valve in each of said inlet pipes to control the rate of supply of liquid to each chamber and also by the inclusion of means individual to each compartment for the withdrawal of clarified liquid therefrom.

31. A clarifier for raw cane juice, comprising, in combination, a tank, a plurality of trays dividing said tank into a plurality of clarifying compartments, means forming a plurality of flocculating chambers each individual to and positioned within one of said compartments, means for injecting raw juice containing matter in suspension to be flocculated into each of said flocculation chambers, and each of said flocculation chambers communicating with its clarifying compartment to permit the passage of flocculated juice thereto.

References Cited in the file of this patent

UNITED STATES PATENTS

| Number | Name | Date |
|---|---|---|
| 1,135,997 | Dorr | Apr. 20, 1915 |
| 1,480,379 | Elliott et al. | Jan. 8, 1924 |
| 1,770,353 | Weber | July 8, 1930 |
| 2,003,357 | Gilchrist | June 4, 1935 |
| 2,195,739 | Rolston | Apr. 2, 1940 |
| 2,253,878 | Weber | Aug. 26, 1941 |
| 2,276,300 | Green | Mar. 17, 1942 |
| 2,340,132 | McHugh et al. | Jan. 25, 1944 |
| 2,402,649 | Logue | June 25, 1946 |
| 2,488,851 | Copp | Nov. 22, 1949 |